United States Patent [19]
Aoki

[11] 3,913,796
[45] Oct. 21, 1975

[54] VENT-TYPE INJECTION MOLDING MACHINE

[75] Inventor: Katashi Aoki, Sakaki, Japan

[73] Assignee: Nissei Plastics Industrial Co., Ltd., Japan

[22] Filed: Oct. 31, 1973

[21] Appl. No.: 411,431

[30] Foreign Application Priority Data
Nov. 6, 1972 Japan............................ 47-127874

[52] U.S. Cl. ................ 222/238; 222/56; 222/413; 425/147; 425/203; 425/205
[51] Int. Cl.[2] ..................... B29F 1/00; B29F 3/06
[58] Field of Search ...... 222/56, 238, 413; 425/145, 425/147, 166, 203, 205

[56] References Cited
UNITED STATES PATENTS

| | | | |
|---|---|---|---|
| 2,568,332 | 9/1951 | Genovese | 222/56 X |
| 2,674,396 | 4/1954 | Peterson | 222/56 |
| 3,183,553 | 5/1956 | Slater | 222/413 UX |
| 3,481,001 | 12/1969 | Stillhard | 425/205 X |
| 3,505,790 | 4/1970 | Rothemich | 222/56 X |
| 3,563,514 | 2/1971 | Shattuck | 222/413 UX |
| 3,609,828 | 10/1971 | Compa et al. | 425/205 X |
| 3,773,221 | 11/1973 | Lesk et al. | 222/56 |

*Primary Examiner*—Robert B. Reeves
*Assistant Examiner*—David A. Scherbel
*Attorney, Agent, or Firm*—Weingarten, Maxham & Schurgin

[57] ABSTRACT

A vent-type injection molding machine which comprises: a preheating cylinder having an extrusion screw therein; an injection cylinder having an injection screw therein; and a supply tube connecting the downstream end of said preheating cylinder and the upstream portion of said injection cylinder; and is characterized in that said supply tube is provided with a vent and sight holes, thus the gases produced in the preheating of the material can be effectively removed through the vent before the material is fed to said injection screw, and the feed of the material from the extrusion screw to the injection screw can be well observed from the outside.

1 Claim, 3 Drawing Figures

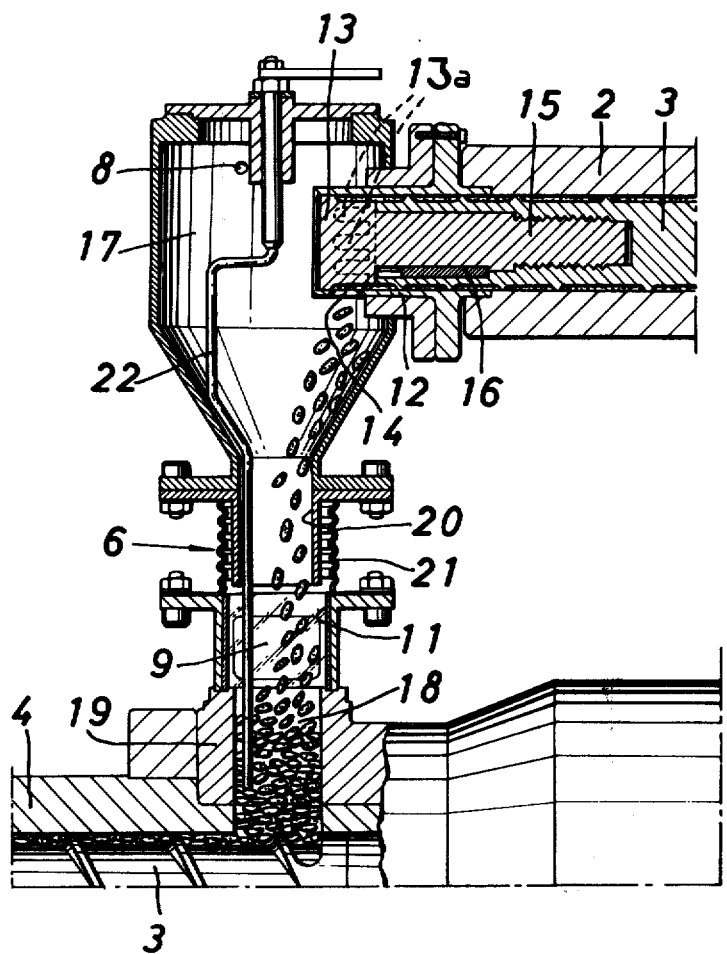

VENT-TYPE INJECTION MOLDING MACHINE

This invention relates to an improved injection molding machine.

More particularly, the invention relates to a vent-type injection molding machine in which the gaseous contents such as moisture, air and other volatile matters produced during the heating process of resin material can be effectively exhausted. Still more, the invention relates to an injection molding machine in which the feed of semi-molten resin material from the preheating cylinder to the injection cylinder can be observed and controlled.

In the injection molding process, when the resin is heated before the injection, some gaseous components such as moisture, air, volatile matters, decomposed products and so forth are generated from the molten resin. Therefore, these gases must be taken out from the cylinder in order to form good molded articles. For this purpose, in the conventional injection molding machine, the injection cylinder is provided with a vent for such gases in the middle portion of said injection cylinder. However, as the cylinder is heated generally from the outside of the cylinder, the resin material adjacent to the inside wall of the injection cylinder is fused more than the material near the injection screw, so that the gases produced in the inner portion of the cylinder can not be completely removed by such vent which is formed on the middle portion of the injection cylinder, and the remained gases within the molten resin are disadvantageous for the quality of final product.

Accordingly, taking the above facts into consideration, the object of the present invention is to provide an improved injection molding machine in which the gases produced during the heating of the resin is completely removed. Another object of the present invention is to provide an injection molding machine in which the gases are completely taken out from the cylinder after the material is preheated and before the material is fed to the injection cylinder.

Further object of the present invention is to provide an injection molding machine in which the feed of semi-molten material from the preheating cylinder to the injection cylinder can be observed through sight holes.

Still other object of the present invention is to provide an injection molding machine which is able to produce molded products of good quality.

Pursuant to the above objects, the injection molding machine of the present invention is provided with a preheating cylinder having an extrusion screw therein and heating resin material to a semi-molten condition; an injection cylinder having an injection screw therein and injecting the resin material into a mold; and a supply tube connecting the downstream end of said preheating cylinder to the upstream portion of said injection cylinder. Said preheating cylinder is positioned on an upper level than the injection cylinder, and said supply tube is positioned vertically between said two cylinders, thereby the semi-molten material may be dropped from the downstream end of the preheating cylinder through the supply tube to the inlet of the injection screw. Further, in the injection molding machine of the invention, the above-mentioned supply tube is provided with a vent to exhaust the gases produced during the preheating step and sight holes to observe the condition within the supply tube, thereby the semi-molten material without gas can be effectively fed to the injection cylinder and the amount of feed of the material can be detected and controlled from the outside. Preferably, the abovementioned sight holes may be provided with a phototube detecting device including a light source and a phototube to detect whether there is some dropping semi-molten material or an accumulated pile of semi-molten material in the supply tube, and the accumulation of the material at the inlet of the injection screw can be checked and the feed velocity of the material from the preheating cylinder can be automatically controlled.

In a preferred embodiment of the present invention, the downstream end of said extrusion screw in the preheating cylinder is provided with a head having a plurality of depressions, and the preheating cylinder is provided with a bush member, thereby through the interaction between said head and bush member, the semi-molten material can be extruded into said supply tube in the form of lumps with a certain size. Further, the supply tube of the invention may be provided with a stirring rod to pass the lumps of material through the passage in said supply tube without causing blocking.

Furthermore, the supply tube of the injection molding machine can be composed of a hopper attached to the preheating cylinder, an intermediate tube attached beneath said hopper, a short tube member forming an inlet of the injection screw and a bellows to connect said intermediate tube and said short tube member, thereby the supply tube can be extended to some extent. In this structure, the sight holes may be positioned at the upper portion of said short tube member which constitutes the inlet of the injection screw.

In order that the invention may be more fully understood, preferred embodiments and various supplementary features will now be described by way of example and with reference to the accompanying drawings, in which:

FIG. 3 is a vertical cross-sectional view of the main portion of the second embodiment of the present invention.

Figure 1:
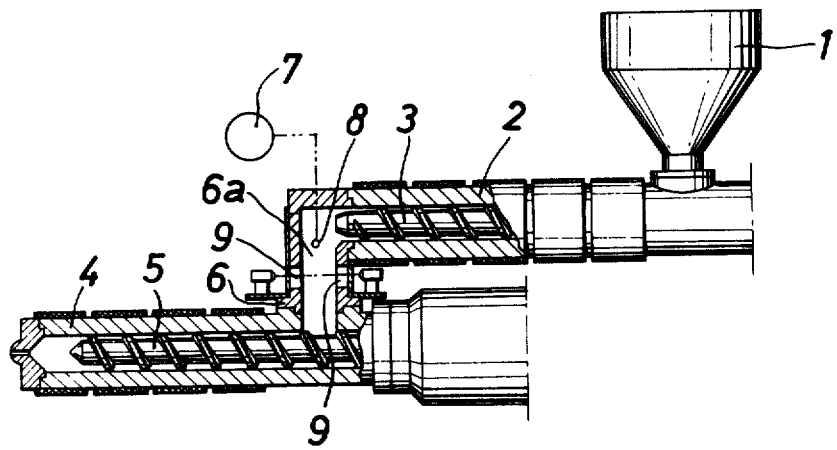
FIG. 1 is a vertical cross-sectional view of the first embodiment of the present invention.
Figure 2:
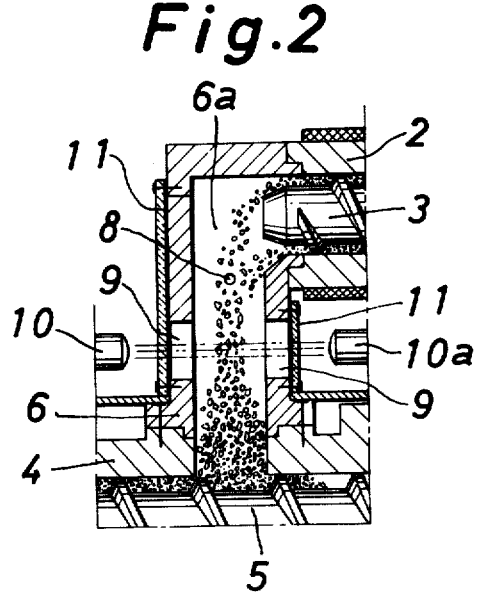
FIG. 2 is an enlarged vertical cross-sectional view of the main portion of said embodiment.

Referring now to the drawings, especially to FIGS. 1 and 2, an injection molding machine for synthetic resin of the present invention is shown, in which the resin material is fed from a hopper 1 into a preheating cylinder 2 which is provided with a plurality of band heaters on its outer surface. The pelletized synthetic resin fed from said hopper 1 is heated and mixed by a screw 3 in said preheating cylinder 2. The numeral 4 indicates a conventional injection cylinder having an injection screw 5 therein. Said preheating cylinder 2 is positioned at the rear upper portion of said injection cylinder 4, where a vertical supply tube 6 connects the downstream end of said preheating cylinder 2 and a side portion of said injection cylinder 4.

The above-mentioned supply tube 6 between said two cylinders 2, 4 is provided with a vent 8 which is connected to a vacuum pump 7, and sight holes 9 through which the passage 6a within the supply tube 6 can be observed from the outside. These sight holes 9 are formed by attaching glass plates 11 on the front and rear sides of the supply tube 6, and a light source 10 and a phototube 10a of a detecting device are installed on the outsides of said sight holes 9. Thereby, the balance of the semi-molten resin material from the preheating cylinder 2 to the injection screw 5 can be detected and regulated. That is, when the supply from the preheating cylinder is in excess, the resin material is accumulated in the lower portion of the supply tube 6, and the light from the light source 10 to the phototube 10a is intercepted thereby varying the electric current flowing through said phototube, so that the driving mechanism of the preheating screw 3 may be stopped or decelerated in a conventional manner.

As disclosed in the above, the pelletized material from the hopper 1 is heated to a certain temperature in the preheating cylinder 2 and push forward by the screw 3 to the supply tube 6. However, in this state, the resin material is not completely molten but the gas contained in the material is driven out by this heating. The gas produced by the preheating is sent forward through the screw 3 together with the resin material, and the semi-molten material is dropped on the injection screw 5 through the passage 6a of the supply tube 6, while the produced gas and moisture are exhausted from the vent 8 to the outside. That is, the gasified contents from the resin material is forced out by a vacuum pump 7 through said vent 8 which is provided to the passage 6a. As the result, the material can be completely deprived of the undesirable gas contents before it is supplied to the injection cylinder 4, and thereafter the material is completely molten and injected to the mold through the injection screw 5.

In the second embodiment as shown in FIG. 3, a bush 12 and a head 13 are attached to the front ends of the preheating cylinder 2 and the extrusion screw 3, respectively so as to cut the semi-molten material into of a certain size lumps and to forward them into the supply tube 6. An extruding aperture 14 is formed at the lower top end portion of said bush 12 which is fixed to the preheating cylinder 2, and said head 13 is fixed to the screw 3 by means of screw threads 15 and a key 16, thus the head 13 is rotated with the screw 3 within said bush 12. A plurality of depressions 13a are formed at regular intervals on the peripheral surface of said head 13, and the lumps of semi-molten resin material are produced by the interaction between these depressions 13a and the abovementioned extruding aperture 14 by the rotation of the screw 3.

Said supply tube 6 comprises a hopper 17 having a vent 8 and a short tube member 19 which is positioned under said hopper 17 and forms an inlet 18 for the injection cylinder 4. Between said hopper 17 and short tube member 19, an intermediate tube 20 is provided which is fixed to said hopper 17, and a bellows 21 is fitted around said intermediate tube 20 so as to seal the gap between the intermediate tube 20 and the short tube member 19 and, at the same time, to made the supply tube 6 somewhat extensible. The abovementioned short tube member 19 is further provided with sight holes 9, to which a glass tube 11 is inserted, thus the inside passage 6a can be observed from the outside through said holes 9. Of course, these sight holes 9 may be provided with a phototube detecting device as disclosed in the foregoing embodiment. Further, a stirring rod 22 may be installed in the supply tube 6 from the upper end of the hopper 17 to the inlet 18.

As explained in the above, the supply tube which is provided with a vent is attached to the front (downstream) end of preheating cylinder, so that the gases contained within the resin material can be advantageously removed, and the material without gas content can be supplied to the injection cylinder, which is excellent as compared with the ordinary injection cylinder having a vent at its middle portion. Further, the condition of the supply of preheated resin material to the supply tube from the preheating cylinder can be observed through the sight holes, and if necessary, the phototube detecting device may be attached, therefore the supply of the material to the injection cylinder can be always controlled and an excess feed or lack of the material can be prevented. Therefore, the vent-type injection molding machine of the present invention is very excellent as compared with the conventional ones.

It should be emphasized, however, that the specific embodiments described and shown herein are intended as merely illustrative and in no way restrictive of the invention.

What is claimed is:

1. A vent-type injection molding machine which comprises:
    a preheating cyclinder having an extrusion screw therein for heating resin material to a semi-molten condition;
    an injection cylinder having an injection screw therein for injecting the resin material into a mold;
    a supply tube connecting the downstream end of said preheating cylinder and the upstream portion of said injection cylinder and is characterized in that said supply tube is provided with a vent and sight holes wherein said extrusion screw is provided with a head having a plurality of depressions, and said preheating cylinder is provided with a bush member having an aperture, thus extruding the semi-molten material in the form of lumps with a certain size.

* * * * *